United States Patent
Ikuina et al.

(10) Patent No.: US 7,037,549 B2
(45) Date of Patent: *May 2, 2006

(54) OIL AND FAT COMPOSITIONS HAVING ANTIFOAMING EFFECT

(75) Inventors: Junichi Ikuina, Yokosuka (JP); Shin Arimoto, Yokosuka (JP)

(73) Assignee: The Nisshin Oillio Group, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/950,660

(22) Filed: Sep. 28, 2004

(65) Prior Publication Data

US 2005/0043554 A1    Feb. 24, 2005

Related U.S. Application Data

(60) Division of application No. 10/369,635, filed on Feb. 21, 2003, now Pat. No. 6,831,185, which is a continuation of application No. PCT/JP01/07266, filed on Aug. 24, 2001.

(30) Foreign Application Priority Data

Aug. 28, 2000  (JP) .............................. 2000-258084
Sep. 11, 2000  (JP) .............................. 2000-274398

(51) Int. Cl.
*A23L 9/007*  (2006.01)

(52) U.S. Cl. ...................... 426/601; 426/607; 426/611; 554/224; 554/227

(58) Field of Classification Search ................ 426/611; 554/227, 224

See application file for complete search history.

(56) References Cited

U.S. PATENT DOCUMENTS

| 5,897,906 | A  | 4/1999 | Suwa et al. |
| 6,261,628 | B1 | 7/2001 | Howie       |

FOREIGN PATENT DOCUMENTS

| JP | 4-197134    |   | 7/1992  |
| JP | 7-16051     |   | 1/1995  |
| JP | 7-16052     |   | 1/1995  |
| JP | 9-52865     | * | 2/1997  |
| JP | 9-74999     |   | 3/1997  |
| JP | 9-299027    |   | 11/1997 |
| JP | 2000-290681 | A | 10/2000 |
| JP | 2000-290682 | A | 10/2000 |
| JP | 2000-290683 | A | 10/2000 |
| JP | 2000-290684 | A | 10/2000 |
| JP | 2000-290685 | A | 10/2000 |
| JP | 2000-309794 | A | 11/2000 |
| JP | 2001-161265 | A | 6/2001  |
| JP | 2001-226693 | A | 8/2001  |

OTHER PUBLICATIONS

Stecher, P. G. 1968. The Merck Index, 8th edition, Merck & Co., Inc., Rahway, NJ. p. 499.*

Stecher, P. G. 1968. The Merck Index, 8th edition, Merck & Co., Inc., Rahway, NJ. p. 499, no month available.*

* cited by examiner

*Primary Examiner*—Carolyn Paden
(74) *Attorney, Agent, or Firm*—Buchanan Ingersoll PC

(57) ABSTRACT

An oil and fat composition exhibiting an antifoaming effect, which comprises: (i) at least 50% by mass of triglycerides comprising fatty acids, wherein the fatty acids comprise fatty acids having 6 to 12 carbon atoms and fatty acids having 14 to 22 carbon atoms in a mass ratio of 5:95 to 95:5; and (ii) 0.01 to 10% by mass of one or more polyglycerol fatty acid ester having an average degree of polymerization of 6 to 10 and an average degree of substitution of 4 to 32, wherein the unsaturated fatty acid content of fatty acids constituting the polyglycerol fatty acid ester is 50 to 100% by mass based on the total fatty acids constituting the polyglycerol fatty acid ester.

8 Claims, No Drawings

OIL AND FAT COMPOSITIONS HAVING ANTIFOAMING EFFECT

CROSS-REFERENCE TO RELATED APPLICATIONS

This application is a divisional of application Ser. No. 10/369,635, filed Feb. 21, 2003, now U.S. Pat. No. 6,831,185 which in turn is a continuation of International Application No. PCT/JP01/07266, filed Aug. 24, 2001, The entire contents of each of the above applications are hereby incorporated by reference.

BACKGROUND OF THE INVENTION

The present invention relates to oil and fat compositions used as general-purpose cooking oils. In particular, the present invention relates to oil and fat compositions containing polyglycerol fatty acid esters, having a high suitability for cooking and exhibiting an excellent antifoaming effect while they are used for cooking.

As heat-cooking oils and fats for deep-frying and stir-frying, there have been used soybean oil, rapeseed oil, corn oil, cotton seed oil, rice bran oil, safflower oil, sunflower oil, sesame oil, olive oil, coconut oil, palm oil, lard and modified oils (transesterified oils and hydrogenated oils) prepared from them alone or in the form of a mixture of two or more of them.

In deep-frying in an oil or fat, a vapor is usually formed from a material being fried and, as a result, foams are formed. While the frying is repeated, the oil or fat is deteriorated and the foaming thereof is accelerated by an influence of ingredients eluted from the materials in the course of the deep-frying. When the foaming is serious, the materials are hidden by the foams and they cannot be seen, and the foams overflow from the pan to make the cooking operation dangerous. Accordingly, the amount of the material that can be deep-fried in the oil is limited. Particularly when the material to be deep-fried contains eggs or meats, the oil or fat is rapidly deteriorated. For controlling the foaming of the oil in the course of the deep-frying, a silicone oil has been added to the oil. However, the use of the silicone oil is recently avoided because the effect thereof is limited and the biodegradability thereof is only low.

A mixed oil of coconut oil and soybean oil and a transesterified oil prepared from medium length fatty acid triglycerides and rapeseed oil foam relatively easily to form a large quantity of the foams. The foaming of triglycerides comprising both fatty acids having 6 to 12 carbon atoms and fatty acids having 14 to 22 carbon atoms cannot be controlled even by the addition of the silicone.

DISCLOSURE OF THE INVENTION

The object of the present invention is to provide oil and fat compositions used as general-purpose cooking oils having a long deep-frying life, which compositions have a controlled foaming in the course of the frying and also good cooking properties.

After intensive investigations made for the purpose of attaining the above-described object, the inventors have found that when a specified polyglycerol fatty acid ester is incorporated in the oil and fat compositions, it becomes easy to remove the foam and the cooking properties of the compositions can be improved. The present invention has been completed on the basis of this finding.

Namely, the present invention relates to oil and fat compositions which comprises triglycerides as the main components and at least 0.01% by mass of one or more polyglycerol fatty acid esters having an average degree of polymerization of 6 to 30 and an average degree of substitution of 4 to 32. In the present invention, the higher the unsaturated fatty acid content of the fatty acids constituting the polyglycerol fatty acid esters, the better. The oil and fat compositions wherein fatty acids constituting the triglycerides are both those having 6 to 12 carbon atoms and those having 14 to 22 carbon atoms are preferred because the effects thereof are remarkable.

DESCRIPTION OF THE PREFERRED EMBODIMENTS

The oil and fat composition of the present invention contains triglycerides as the main components and also at least 0.01% by mass of one or more polyglycerol fatty acid esters having an average degree of polymerization of 6 to 30 and an average degree of substitution of 4 to 32. The term "main components" indicates that the triglyceride content is at least 50% by mass. The oil and fat composition of the present invention has a triglyceride content of preferably 50 to 99.99% by mass, more preferably 50 to 99.9% by mass and particularly preferably at least 90% by mass.

The glycerides mainly comprising triglycerides include oil and fat starting materials such as ordinary edible oils, transesterified oils, glycerol esters and hydrolyzates of them. The raw materials of oils and fats include, for example, soybean oil, rapeseed oil, corn oil, sesame oil, sesame salad oil, perilla oil (Shiso-yu), linseed oil, peanut oil, safflower oil, safflower oil having a high oleic acid content, sunflower oil, sunflower oil having a high oleic acid content, cotton seed oil, grapeseed oil, macadamia nut oil, hazelnut oil, pumpkin nut oil, walnut oil, camellia oil, tea seed oil, perilla oil (Egoma-yu), borage oil, olive oil, rice bran oil, wheat germ oil, palm oil, palm kernel oil, coconut oil, cacao butter, beef tallow, lard, chicken fat, mild fat, fish oil, seal oil, alga oil, medium length fatty acid triglycerides, these oils and fats having a saturation degree lowered by the improvement in the quality, oils and fats obtained by the hydrogenation of them and fractionated oils and fats. The raw materials of oils and fats are not limited to them.

The polyglycerol fatty acid esters having an average degree of polymerization of 6 to 30 and an average degree of substitution of 4 to 32 have an effective antifoaming effect. The polyglycerol fatty acid esters can be used either alone or in the form of a mixture of two or more of them. Although diglycerol fatty acid esters having an average degree of polymerization of 2 also have the antifoaming effect, the effect is less than that of the polyglycerol fatty acid esters of the present invention. Polyglycerol fatty acid esters having an average degree of polymerization of higher than 2 and lower than 6 and an average degree of polymerization of lower than 4 have no antifoaming effect and, they sometimes have a contrary effect. They have a low solubility in fats and oils and the obtained solution is cloudy or an insoluble matter deposits or precipitates therein in many cases. On the contrary, the polyglycerol fatty acid esters having an average degree of polymerization of 6 to 30 and an average degree of substitution of 4 to 32 have an effective antifoaming effect, and a high solubility in oils and fats. Those having an average degree of polymerization of 9 to 25 and an average degree of substitution of 5 to 27 are preferred, and those having an average degree of polymerization of 11 to 20 and an average degree of substitution of 6 to 20 are more preferred.

The average degree of substitution is not higher than "average degree of polymerization+2". For example, when the average degree of polymerization is 10, the average degree of substitution is not higher than 12.

In the present invention, the term "average degree of polymerization of polyglycerol fatty acid esters" indicates the average degree of polymerization of the polyglycerols constituting the esters. The average degree of polymerization (n) of the polyglycerols is determined from the measured hydroxyl group value (OHV) of the polyglycerols and the theoretical value according to formula (3) given below. The hydroxyl group value (OHV) of the polyglycerols is determined by the standard oil-and-fat analysis method. The average molecular weight (MW) is determined by the following formula (1):

$$MW=74n+18 \quad \text{(formula 1)}$$

$$OHV=56110\,(n+2)/MW \quad \text{(formula 2)}$$

From formulae (1) and (2):

$$n=(112220-18\times OHV)/(74\times OHV-56110) \quad \text{(formula 3)}$$

In the present invention, the average degree of substitution is determined from the molar ratio of polyglycerols to fatty acids subjected to the reaction for synthesizing the polyglycerol fatty acid esters. The molar ratio of compounds subjected to the reaction is the ratio of the amount (mole) of the polyglycerols subjected to the reaction to the amount (mole) of the fatty acids subjected to the reaction, wherein the amount (mole) of the polyglycerols subjected to the reaction is determined by dividing the mass (grams) of the polyglycerols subjected to the reaction by the average molecular weight (MW) of the polyglycerols determined from the above-described, determined hydroxyl group value of the polyglycerols. For example, the polyglycerol fatty acid esters of the present invention having an average degree polymerization of 15 and an average degree of substitution of 8 have a measured hydroxyl group value of the charged polyglycerols of 846, and the average degree of polymerization (n) of polyglycerols is 15 and the average molecular weight (MW) of 1128 according to the above-described formulae. After the synthesis by using 1128 g (1 mol) of the polyglycerols and oleic acid (8 mols), the average degree of polymerization and the average degree of substitution are determined to be 15 and 8, respectively. In this case, the saponification value and hydroxyl group value of the polyglycerol fatty acid esters are determined to be 130 to 160 and 130 to 160, respectively.

When the unsaturated fatty acid content of the total constituent fatty acids in the polyglycerol fatty acid esters is less than 50% by mass, the solubility of the esters in the oils and fats is often not as high as expected. In some cases, the obtained solution is cloudy or an insoluble matter deposits or precipitates therein. Therefore, unsaturated fatty acid content of the total constituent fatty acids in the polyglycerol fatty acid esters is preferably 50 to 100% by mass and more preferably 70 to 100% by mass.

In the present invention, the term "constituent fatty acid content" is a numerical value obtained by methyl-esterifying or trimethyl-silylating the polyglycerol fatty acid esters and calculating it from the fatty acid composition analyzed by GLC (gas chromatography).

Generally, oils and fats containing medium length fatty acids, such as mixed oils of medium length fatty acid triglycerides and long chain fatty acid triglycerides, or transesterified oils of them, violently make foams. In such a case, the oil and fat composition of the present invention exhibits a remarkable effect and is suitably used. Namely, the constituent fatty acids of the triglycerides preferably contain medium length fatty acids (6 to 12 carbon atoms). In particular, when the constituent fatty acids of the triglycerides in the oil and fat composition include both fatty acids having 6 to 12 carbon atoms and fatty acids having 14 to 22 carbon atoms, the antifoaming effect of the present invention is remarkable. Thus, those fatty acids are preferred. In such a case, the remarkable effect can be obtained particularly when the ratio (% by mass) of the fatty acids having 6 to 12 carbon atoms to the fatty acids having 14 to 22 carbon atoms is 5:95 to 95:5.

The polyglycerol fatty acid esters used in the present invention are generally obtained by the transesterification reaction of a polyglycerol, obtained by the dehydration condensation of glycerol or synthesized from glycidol or epichlorohydrin, with a fatty acid. However, the method for synthesizing those polyglycerol fatty acid esters is not limited to this method.

The aliphatic carboxylic acids constituting the polyglycerol fatty acid esters are preferably saturated linear fatty acids unsaturated linear fatty acids and organic acids each having 2 to 22 carbon atoms. Examples of them include caproic acid, caprylic acid, capric acid, lauric acid, myristic acid, palmitic acid, stearic acid, arachidic acid, behenic acid, lignoceric acid, cerotic acid, palmitooleic acid, oleic acid, elaidic acid, linoleic acid, linolenic acid, eicosapentaenoic acid, docosahexaenoic acid, arachidonic acid, erucic acid, hydroxyfatty acids, ricinoleic acid, condensed ricinoleic acid, acetic acid and isobutyric acid. However, the aliphatic carboxylic acids are not limited to them. In these acids, fatty acids having 8 to 20 carbon atoms are preferred and those having 12 to 18 carbon atoms are more preferred.

The oil and fat composition of the present invention contains at least 0.01% by mass, preferably 0.01 to 10% by mass and more preferably 0.1 to 5% by mass, of the polyglycerol fatty acid esters. The oil and fat composition containing 0.1 to 3% by mass of the polyglycerol fatty acid esters has the best cooking properties.

The oil and fat composition of the present invention obtained as described above is usable for the cooking as it is or after the incorporation of additives usually added to cooking oil and fat compositions.

The additives are those used for the purposes of obtaining the synergistic antifoaming effect, improving the storability, improving the oxidation stability, improving heat stability and inhibiting the crystallization at a low temperature, such as polyglycerol fatty acid esters, sucrose fatty acid esters, glycerol fatty acid esters, sorbitan fatty acid esters, sorbitol fatty acid esters, vitamin E, ascorbic acid fatty acid esters, lignan, coenzyme Q, phospholipids, silicone oil and oryzanol; and also those used for the purposes of preventing adult diseases, preventing diseases caused by life habits, controlling in vivo oxidation and preventing adiposis, such as vitamin E, ascorbic acid fatty acid esters, lignan, coenzyme Q, phospholipids and oryzanol.

The cooking oil and fat composition of the present invention has a flavor and a taste equivalent or superior to those of ordinary vegetable oils available on the market, such as rapeseed oil, corn oil, safflower oil and soybean oil. This composition is usable not only for making stir-fried foods, deep-fried foods, marinades, etc. but also for making foods containing an oil or a fat, such as dressings, mayonnaise, margarine, confectioneries, cakes and drinks.

The following Examples will further illustrate the present invention, which by no means limit the invention.

EXAMPLES

<Preparation of Polyglycerol Fatty Acid Esters>

Glycerol was mixed with sodium hydroxide. The obtained mixture was heated to 90° C. and then dried under reduced pressure. The mixture was then heated at 200 to 270° C. and stirred to conduct the reaction. After the completion of the reaction, the reaction mixture was filtered to obtain polyglycerols. The polyglycerols were various depending on the reaction temperature in the above-described range. Diglycerol (average degree of polymerization: 2) was obtained by the molecular distillation of the synthesized polyglycerols. Polyglycerols having an average degree of polymerization of higher than 10 were obtained by GPC of polyglycerols having an average degree of polymerization of 10 to remove those having a low degree of polymerization. Various polyglycerols obtained as described above were mixed with various fatty acids to conduct the reaction in the presence of sodium hydroxide as the catalyst at 200° C. in nitrogen gas stream to obtain polyglycerol fatty acid esters (a to w). The polyglycerol fatty acid esters thus obtained are shown in Table 1 given below.

The average degree of polymerization and the average degree of substitution were determined according to the above-described calculation formulae.

TABLE 1

| | Polyglycerol fatty acid esters | | | | | | | |
|---|---|---|---|---|---|---|---|---|
| | Average degree of polymerization | Average degree of substitution | Main fatty acids (%) | | | | | |
| | | | $C_{12:0}$ | $C_{14:0}$ | $C_{16:0}$ | $C_{18:0}$ | $C_{18:1}$ | $C_{18:2}$ |
| a | 2 | 1 | | | 30 | 15 | 45 | 10 |
| b | 4 | 1 | | | 9 | 6 | 80 | 5 |
| c | 4 | 4 | | | 31 | 69 | | |
| d | 5 | 6 | | | 9 | 6 | 80 | 5 |
| e | 6 | 5 | | | 9 | 6 | 80 | 5 |
| f | 8 | 8 | | | 28 | 25 | 41 | 6 |
| g | 9 | 6 | | | 9 | 6 | 80 | 5 |

TABLE 1-continued

| | Polyglycerol fatty acid esters | | | | | | | |
|---|---|---|---|---|---|---|---|---|
| | Average degree of polymerization | Average degree of substitution | Main fatty acids (%) | | | | | |
| | | | $C_{12:0}$ | $C_{14:0}$ | $C_{16:0}$ | $C_{18:0}$ | $C_{18:1}$ | $C_{18:2}$ |
| h | 10 | 1 | | | 9 | 6 | 80 | 5 |
| i | 10 | 10 | | | 9 | 6 | 80 | 5 |
| j | 15 | 8 | | | 7 | 2 | 74 | 17 |
| x | 15 | 7 | 3 | 5 | 45 | 1 | 40 | 7 |
| w | 10 | 9 | 34 | 3 | 2 | 4 | 51 | 6 |

<Comparative Examples 1 to 12 and Examples 1 to 10>

Comparative fat and oil compositions and the fat and oil compositions of the present invention shown in Tables 2 and 3 were prepared and they were subjected to a foam-height test and a solubility test.

(Foam Height Tests)

20 g of each of oil and fat compositions was fed into a test tube (diameter: 25 mm, length: 200 mm) and heated to 160° C. with a block heater (Dry Thermo Unit DTU-20 TAITEC CORPORATION). A potato cube having a size of 1 cm×1 cm×1 cm was thrown into the composition, and the highest height, from the oil surface level measured before the heating, of generated foams was taken as the foam height.

Evaluation:
  ≦40 mm: Antifoaming effect was recognized.
  40<≦80 mm: Slight antifoaming effect was recognized.
  >80 mm: Antifoaming effect was not recognized.

(Determination of Solubility)

100 g of each of the oil and fat compositions was fed into a 200 ml beaker, heated to 50° C. and cooled to 30° C. Whether a clouding, milky opaqueness or the formation of insoluble matter was found or not was examined.

Evaluation:
  ○: Clear
  Δ: Slight milky opaqueness or insoluble matter was found.
  X: Milky opaqueness or the formation of insoluble matter was found.

TABLE 2

Composition and evaluation

| | Comparative Example | | | | | | Example (parts by mass) | | | | |
|---|---|---|---|---|---|---|---|---|---|---|---|
| | 1 | 2 | 3 | 4 | 5 | 6 | 1 | 2 | 3 | 4 | 5 |
| (Oil and fat composition) | | | | | | | | | | | |
| (Deteriorated) rapeseed oil (shirasame-yu) | 100 | 99 | 99 | 99 | 99 | 99 | 99 | 99 | 99 | 99 | 99 |
| a | | 1 | | | | | | | | | |
| b | | | 1 | | | | | | | | |
| c | | | | 1 | | | | | | | |
| d | | | | | 1 | | | | | | |
| e | | | | | | 1 | | | | | |
| f | | | | | | | 1 | | | | |
| g | | | | | | | | 1 | | | |
| h | | | | | | | | | 1 | | |
| i | | | | | | | | | | 1 | |
| j | | | | | | | | | | | 1 |

TABLE 2-continued

| | Composition and evaluation | | | | | | | | | | |
|---|---|---|---|---|---|---|---|---|---|---|---|
| | Comparative Example | | | | | | Example (parts by mass) | | | | |
| | 1 | 2 | 3 | 4 | 5 | 6 | 1 | 2 | 3 | 4 | 5 |
| Height of foams (mm) | 113 | 45 | 110 | 100 | 86 | 90 | 37 | 30 | 25 | 18 | 15 |
| Solubility | ○ | Δ | ○ | X | ○ | X | ○ | Δ | ○ | ○ | ○ |

Notes)
A deteriorated rapeseed oil (shirashime-yu) was used in the tests for determining the height of foams, and a fresh rapeseed oil (shirashime-yu) was used for the evaluation of the solubility.
Deteriorated rapeseed oil (shirashime-yu): An oil deteriorated by using fresh rapeseed oil (shirashime-yu) for deep-frying 10 pieces of potatoes, 12 pieces of chicken and 10 pieces of breaded pork cutlets.

TABLE 3

| | Composition and evaluation | | | | | | | | | | |
|---|---|---|---|---|---|---|---|---|---|---|---|
| | Comparative Example | | | | | | Example (parts by mass) | | | | |
| | 7 | 8 | 9 | 10 | 11 | 12 | 6 | 7 | 8 | 9 | 10 |
| | (Oil and fat composition) | | | | | | | | | | |
| (Deteriorated) sesame salad oil | 100 | 95 | | 99 | 94 | | 99 | 94 | | | |
| (Deteriorated) MCT | | 5 | | | 5 | | 5 | | | | |
| (Deteriorated) MLCT | | | 100 | | | 99 | | | 99 | 99 | 99 |
| b | | | | 1 | | | | | | | |
| d | | | | | 1 | | | | | | |
| e | | | | | | | 1 | | | | |
| f | | | | | | | | 1 | | | |
| g | | | | | | | | | 1 | | |
| h | | | | | | 1 | | | | | |
| i | | | | | | | | | | 1 | |
| j | | | | | | | | | | | 1 |
| Height of foams (mm) | 115 | 130 | 127 | 114 | 120 | 95 | 36 | 37 | 29 | 25 | 17 |
| Solubility | ○ | ○ | ○ | ○ | ○ | X | ○ | Δ | ○ | ○ | ○ |

Notes)
A deteriorated sesame salad oil, deteriorated MCT and deteriorated MLCT were used for the tests for determining the height of foams, and a fresh sesame salad oil, fresh MCT and fresh MLCT were used for the evaluation of the solubility.

MCT: Triglycerides composed of caprylic acid and capric acid (mass ratio: 75:25) as the constituent fatty acids
MLCT: An oil obtained by the transesterification of rapeseed oil and MCT in a mass ratio of 8:2
Deteriorated sesame salad oil, deteriorated MCT and deteriorated MLCT: The oils each deteriorated by using it for deep-frying 10 pieces of potatoes, 12 pieces of chicken and 10 pieces of breaded pork cutlets.

Comparative Examples 13 to 15 and Examples 11 to 17

Comparative oil and fat compositions and the oil and fat compositions of the present invention shown in Table 4 were prepared and subjected to a deep-frying test.

(Deep-Frying Test)

600 g of each of oil and fat compositions was fed into an electric home cooking fryer, and 6 deep-fried shrimps, 4 pieces of croquettes, 10 pieces of deep-fried chicken and 10 pieces of breaded pork cutlets were prepared therein at 180° C. The degree of foaming of the oil, emitting of smoke after the completion of the test and the taste of the fried foods were evaluated.

(Determination of Foaming):
⊙: excellent
○: ordinary foaming
Δ: strong foaming
x: violent foaming (Evaluation of Taste)

As compared with rapeseed oil (shirashime-yu):
⊙: equivalent
Δ: The flavor and taste are a little different, but the difference is insignificant.
X: The flavor and taste are different and the deep-fried food did not taste good.

TABLE 4

| | Comparative Example | | | Example | | | | | | | (parts by mass) |
|---|---|---|---|---|---|---|---|---|---|---|---|
| | 13 | 14 | 15 | 11 | 12 | 13 | 14 | 15 | 16 | 17 | |
| (Oil and fat composition) | | | | | | | | | | | |
| Rapeseed oil (shirasame-yu) | | | | | 85 | 97 | 98 | | | | |
| Sesame salad oil | 100 | 95 | | 82 | | | | 99 | 92 | | |
| MCT | | 5 | | 5 | | | | | 5 | | |
| MLCT | | | 100 | | | | | | | 99.5 | |
| e | | | | | 15 | 3 | | | | | |
| g | | | | 13 | | | 2 | | 3 | | |
| j | | | | | | | | 1 | | 0.5 | |
| (Foaming) | | | | | | | | | | | |
| Deep-fried shrimps | ○ | X | ○ | ⊚ | ⊚ | ⊚ | ⊚ | ⊚ | ⊚ | ⊚ | |
| Croquettes | ○ | X | △ | ⊚ | ⊚ | ⊚ | ⊚ | ⊚ | ⊚ | ⊚ | |
| Deep-fried chicken | △ | X | △ | ⊚ | ⊚ | ○ | ⊚ | ⊚ | ⊚ | ⊚ | |
| Breaded pork cutlets | X | X | X | ⊚ | ⊚ | ○ | ⊚ | ○ | ○ | ⊚ | |
| Smoking | ○ | △ | ○ | X | △ | ○ | ○ | ○ | ○ | ○ | |
| Flavor and taste | ○ | ○ | ○ | X | △ | ○ | ○ | ○ | ○ | ○ | |

Examples 18 and 19

Deep-frying tests were conducted by using MLCT containing 2% by mass (g) or 0.5% by mass (x) of polyglycerol fatty acid esters (Example 18) or 2% by mass (g) or 0.5% by mass (w) of polyglycerol fatty acid esters (Example 19). In both Examples 18 and 19, the cooking was possible without any problem, and the cooked foods had excellent flavor and taste. After keeping the oils at 0° C. for 2 weeks, both oils used in Examples 18 and 19 were transparent and clear, and no milky opaqueness or the formation of insoluble matter was found.

As described above in detail, the present invention relates to oil and fat compositions used as general-purpose cooking oils having a long deep-frying life, which compositions have a controlled foaming in the course of the frying and also good cooking properties.

What is claimed is:

1. An oil and fat composition exhibiting an antifoaming effect, which comprises:
   (i) at least 50% by mass of triglycerides comprising fatty acids, wherein the fatty acids comprise fatty acids having 6 to 12 carbon atoms and fatty acids having 14 to 22 carbon atoms in a mass ratio of 5:95 to 95:5; and
   (ii) 0.01 to 10% by mass of one or more polyglycerol fatty acid ester having an average degree of polymerization of 6 to 10 and an average degree of substitution of 4 to 32, wherein the unsaturated fatty acid content of fatty acids constituting the polyglycerol fatty acid ester is 50 to 100% by mass based on the total fatty acids constituting the polyglycerol fatty acid ester.

2. The oil and fat composition according to claim 1, wherein the unsaturated fatty acid content of the fatty acids constituting the polyglycerol fatty acid ester is 70 to 100% by mass based on the total fatty acids constituting the polyglycerol fatty acid ester.

3. The oil and fat composition according to claim 1, wherein aliphatic carboxylic acids constituting the polyglycerol fatty acid ester have 8 to 20 carbon.

4. The oil and fat composition according to claim 1 wherein the average degree of substitution is 5 to 10.

5. The oil and fat composition according to claim 1 wherein the composition further comprises an additive selected from the group consisting of sucrose fatty acid esters, glycerol fatty acid esters, sorbitan fatty acid esters, sorbitol fatty acid esters, vitamin B, ascorbic acid fatty acid esters, lignan, coenzyme Q, phospholipids, silicone oil and oryzanol.

6. The oil and fat composition according to claim 1 wherein the composition further comprises an additive selected from the group consisting of sucrose fatty acid esters, glycerol fatty acid esters, sorbitan fatty acid esters and sorbitol fatty acid esters.

7. A food selected from the group consisting of dressings, mayonnaise, margarine, confectioneries, cakes and drinks, which comprises the oil and fat composition according to claim 1.

8. The oil and fat composition according to claim 1 wherein aliphatic carboxylic acids constituting the polyglycerol fatty acid ester have 12 to 18 carbon atoms.

* * * * *